Aug. 9, 1932.                        C. DE WITT                        1,870,771
                JOINT FOR CONNECTING TUBULAR SECTIONS OF POLES AND THE LIKE
                                  Filed May 26, 1930
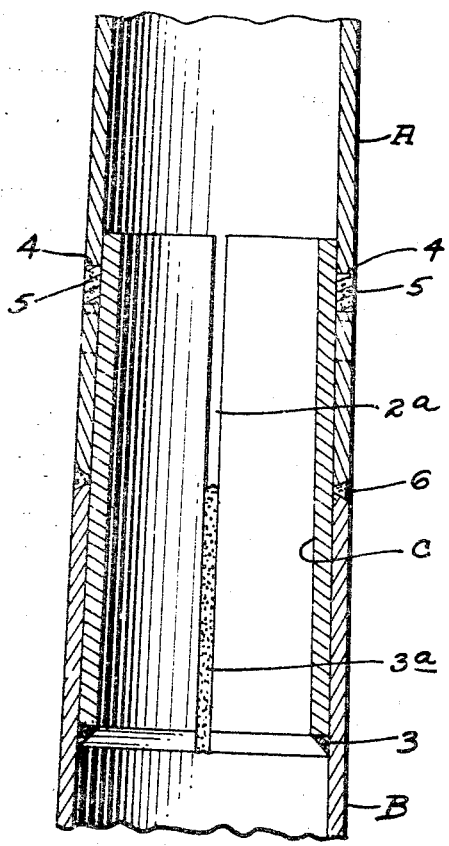
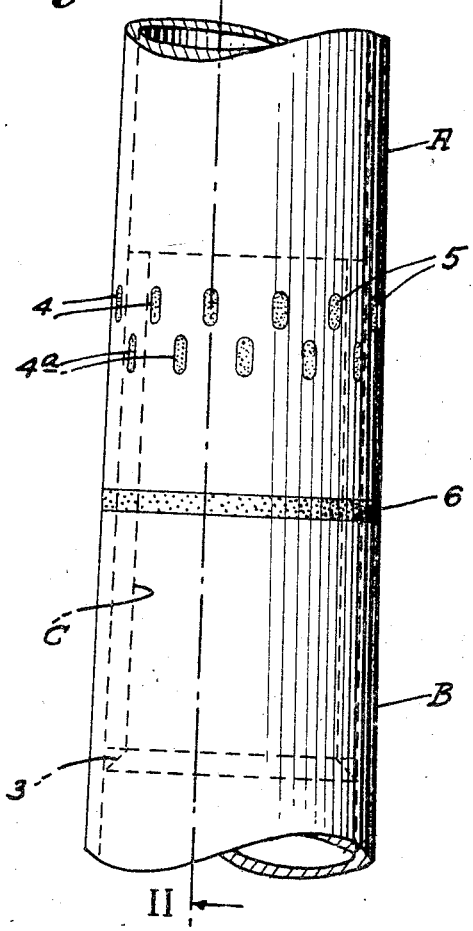
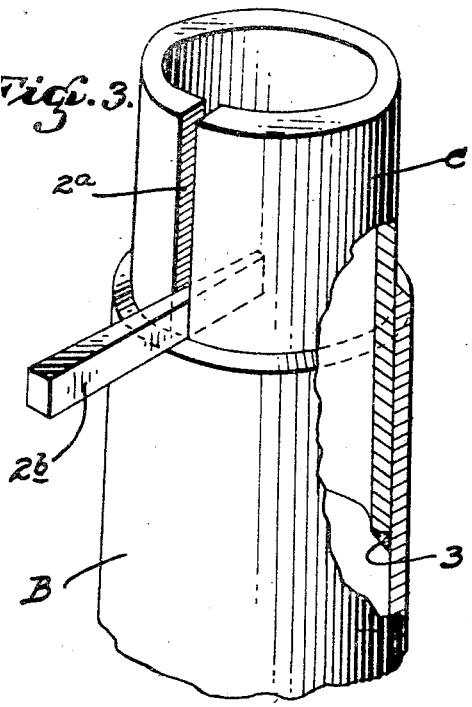
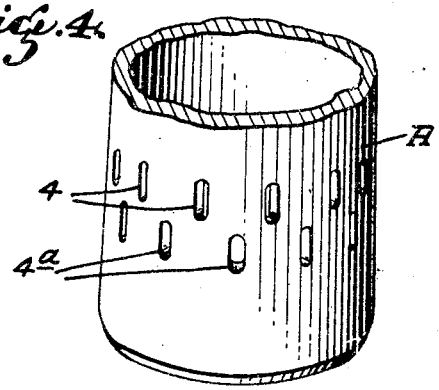
INVENTOR.
Clinton de Witt
BY
Townsend Loftus & Abbett
ATTORNEYS.

Patented Aug. 9, 1932

1,870,771

UNITED STATES PATENT OFFICE

CLINTON DE WITT, OF SAN FRANCISCO, CALIFORNIA

JOINT FOR CONNECTING TUBULAR SECTIONS OF POLES AND THE LIKE

Application filed May 26, 1930. Serial No. 455,725.

This invention relates to a joint for connecting tubular sections of poles and the like, and especially to a joint which permits a rigid welded connection between two tapering tubular pole sections, where a smooth exterior finish is required.

In the building of tubular poles, either cylindrical or tapered in shape, from open hearth steel or of welded construction, it has been found necessary in some instances to make a pole which in appearance is absolutely smooth on the outside and to the eye the finished structure appears to be a continuous one-piece tube of whatever finished length the pole may be.

Tubular poles, especially flag poles, which taper from end to end are often so small in diameter that it is impossible to get a man inside thereof and as poles of this character are usually of considerable length it has been found that the usual method of joining the sections together by means of a butt-weld is not satisfactory. The reasons therefor are as follows:

A pole in actual service, whether bolted to a foundation by means of a flange connection or put in the ground a sufficient distance to support the same is subject to constant vibration from wind or traffic. Any joint on such pole is not only subject to bending stresses tending to rupture the joint but in addition is subject to constant vibration caused by wind, traffic, etc. This vibration, being substantially continuous, becomes a strain at each and every joint where the pole is welded, and as is well known, continuous vibration will eventually cause crystallization and produce fracture of a butt-welded joint. Thus, an ordinary butt-weld of two adjacent tubular pole sections is not suited for this condition and it is necessary to reinforce the joint with an inner sleeve, over which each of the connecting pole sections must fit.

The customary method of construction of such a joint in poles of diameter too small for a man to work inside, is to fit the sleeve into one pole section and weld the inside end of the sleeve solidly to the pole. The adjoining pole section is then slipped over and brought snug to the first pole section and the seam at the point of contact is welded solidly. This construction, while stronger than an unreinforced butt-joint, retains the weakness that the second pole section is secured by a single line of weld and vibration will develop play in the joint and eventually effect a fracture of the weld.

The object of the present invention is to generally improve and simplify the construction and operation of tubular pole joints of the reinforced type; to provide a tubular pole joint which permits a plurality of rigid welded connections to be made between a pair of adjacent abutted tubular sections and an interior reinforcing sleeve; to provide a reinforced welded tubular pole joint which permits the formation of a smooth exterior finished surface; and further, to provide an interior reinforcing sleeve which may be snugly fitted and welded to the adjoining sections so as to produce a friction joint in addition to the weld.

The reinforced joint is shown by way of illustration in the accompanying drawing, in which—

Fig. 1 is a side elevation of a tapering tubular pole joint completed,

Fig. 2 is a central vertical section taken on line II—II of Fig. 1,

Fig. 3 is a perspective view showing the reinforcing sleeve while being welded with relation to one of the tubular pole sections, and Fig. 4 is a perspective view of the abutting end of an adjacent tubular pole section.

Referring to the drawing in detail and particularly Figs. 1 and 2, A and B indicate a pair of tapering tubular pole sections which are to be joined, and C an interior reinforcing sleeve which is inserted in each joint. The reinforcing sleeve is split as indicated at 2a and is inserted in a tubular pole section indicated at B, see Fig. 3, so as to provide a projecting end tube. The sleeve by being split may be snugly fitted by expanding it, for instance, by means of a wedge 2b, and when so fitted it is welded at the point indicated at 3 to the interior surface of the tubular pole section B and it is also welded along the split as indicated at 3a. The tubular pole section A is then slipped over the projecting end 2 of the reinforcing sleeve and it is moved into abutment with the tubular pole section B.

Prior to applying the tubular pole section A, wedge 2b is removed without any danger of the sleeve contracting as the weld indicated at 3a will retain the sleeve in its expanded condition. A plurality of slots 4 are then cut in the tube section A and tube A is driven down over the projecting end 2 of the sleeve, care being taken that sleeve C is sufficiently expanded to form a friction tight joint. The slots 4 form openings through which a welded connection may be made between the upper end of the reinforcing sleeve and the tube section A. During the welding the weld metal is built up as shown at 5 and the exterior surface may thus be ground off to form a smooth continuous surface. The butt joint is also welded as indicated at 6 and this is similarly ground off and finished to present a smooth surface.

The welded joint indicated at 3 together with the longitudinal weld formed in the split of the sleeve and indicated at 3a forms a rigid connection between the lower end of the reinforcing sleeve and the tubular section B. Furthermore by expanding the sleeve through means of the wedge 2b a friction joint is produced. The weld indicated at 6 connects the abutting ends of the tubes A and B and it also forms a connection with the exterior surface of the reinforcing sleeve. The welds formed through the slots 4 form a series of welded connections between the upper end of the reinforcing sleeve and the tube A, hence a rigid welded connection is formed at a number of points between each tube section A and B and the reinforcing sleeve and a friction joint is also obtained in addition thereto.

In actual practice, it may be stated that a solid sleeve could be employed but it has been found more or less impractical as absolute uniformity in dimensions is difficult to obtain in manufacture, particularly when making tapering tube sections, hence by splitting the sleeve as shown and by expanding it through wedge means or the like, when inserted, a snug frictional fit similar to a driving or machine fit may be obtained prior to welding the sleeve to the tubular sections. The welding may be accomplished electrically or oxy-acetylene welding may be employed as the case may be.

The double line of staggered slots formed above the butt-joint 6 as indicated at 4a and 5, together with the weld 3 and the longitudinal weld 3a, produces such a rigid connection between the tubular sections A and B that play at the butt-joint 6 is absolutely eliminated, hence producing a pole which should act as if it were made in one piece and as the exterior welds indicated at 4a, 5 and 6 may be ground smooth without weakening the joints the pole is given the appearance of being made in one solid unit without joints.

In conclusion it might be stated that the joints, when completed, produce a structure of exceedingly rigid construction as the reinforcing sleeves, when snugly fitted, are reinforced by the welded joints, etc., tending to produce an integral structure, thus eliminating any play from vibration at any one of the joints, and transferring the entire effect of vibration to the ground line where the support or foundation may absorb the vibration.

While the drawing illustrates a tube or pole of tapering construction, it should be understood that tubular sections of uniform diameter may be joined with this reinforcing sleeve in the same manner as described, and while other features of the present invention are more or less specifically described, I wish it understood that various changes may be resorted to within the scope of the appended claims. Similarly, that the materials and finishes of the several parts employed may be such as the manufacturer may decide, or varying conditions or uses may demand.

Having thus described my invention, what I claim and desire to secure by Letters Patent is—

1. In a structure of the character described, a pair of abutting tubes, an expansible reinforcing sleeve mounted interior of the tubes, and a plurality of welded connections formed between each tube and the interior reinforcing sleeve.

2. In a structure of the character described, a pair of abutting tubes, an expansible reinforcing sleeve mounted interior of the tubes, a plurality of welded connections formed between each tube and the interior reinforcing sleeve, means for expanding the sleeve, and means for retaining the sleeve in an expanded condition within the tubes.

3. In a structure of the character described, a pair of abutting tubes, a split expansible reinforcing sleeve mounted interior of the tubes, and a plurality of welded connections formed between each tube and the interior reinforcing sleeve.

4. In a structure of the character described, a pair of abutting tubes, a split expansible reinforcing sleeve mounted interior of the tubes, said split sleeve being adapted to be expanded within the tubes to form a friction joint between the same, and a plurality of welded connections formed between each tube and the interior split sleeve after expansion of the sleeve, said welded connections including a filler weld formed in the split of the sleeve to prevent contraction of the sleeve.

5. In a structure of the character described, a tube, a longitudinally split reinforcing sleeve insertable in the tube and having its upper end projecting from the tube, said sleeve being adapted to receive expanding means in the split portion thereof for expanding the sleeve within the tube, a welded connection formed between the inner end of the split sleeve and the interior surface of the tube, said weld being extended up the split portion of the sleeve to further secure the sleeve to the tube and to prevent contraction of the sleeve and also to permit removal of the expanding means, a second tube adapted to be received by the projecting end of the reinforcing sleeve, said second tube abutting the first named tube, and a welded connection formed between the abutting ends of the respective tubes and the interior reinforcing sleeve.

6. In a structure of the character described, a tube, a longitudinally split reinforcing sleeve insertable in the tube and having its upper end projecting from the tube, the split portion of the sleeve being adapted to receive means for expanding the sleeve within the tube, a welded connection formed between the inner end of the split sleeve and the interior surface of the tube, said weld being extended up the split portion of the sleeve to further secure the sleeve to the tube and to prevent contraction of the sleeve and also to permit removal of the expanding means, a second tube adapted to be received by the projecting end of the reinforcing sleeve, said second tube abutting the first named tube, a welded connection formed between the abutting ends of the respective tubes and the interior reinforcing sleeve, said second named tube having a plurality of slots formed therein, and said slots permitting a welded connection to be formed between the second named tube and the exterior surface of the upper end of the reinforcing sleeve.

CLINTON DE WITT.